(No Model.)
C. A. READE.
VEHICLE.
No. 475,891. Patented May 31, 1892.
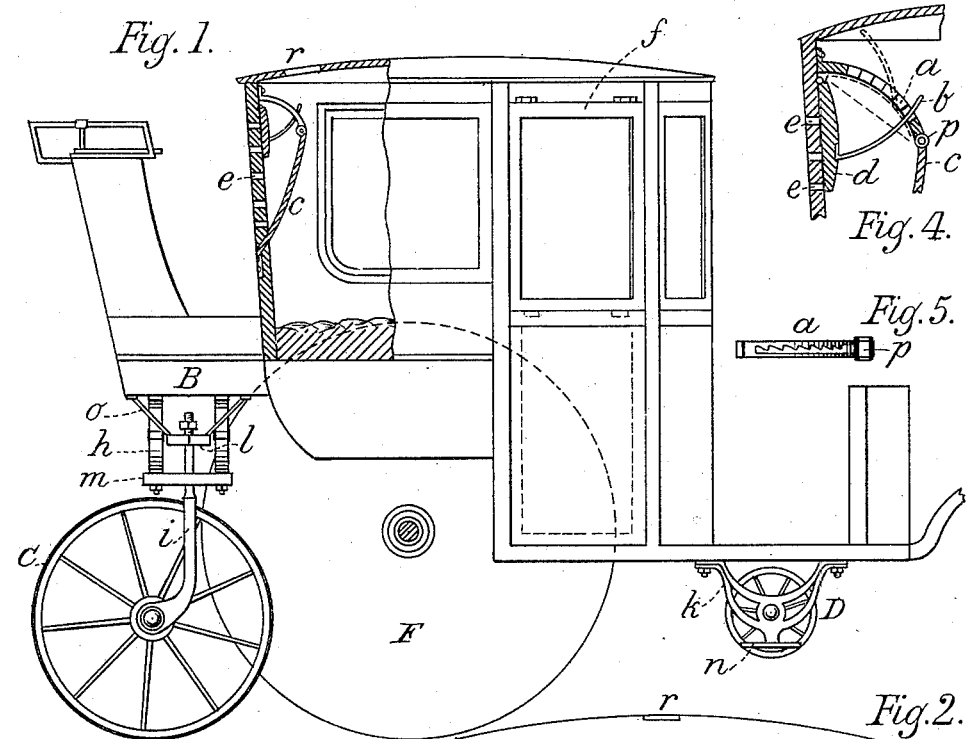
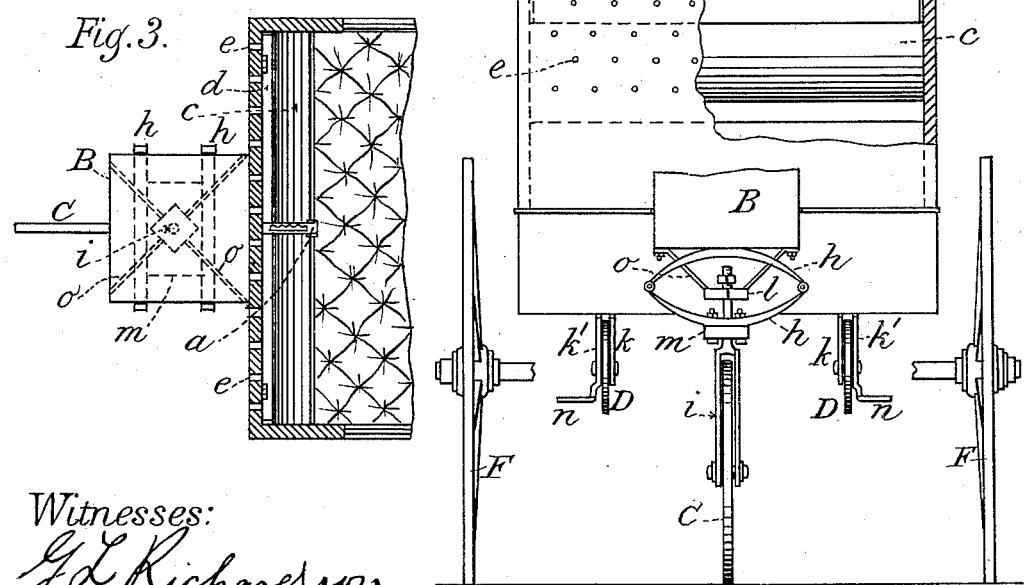
Witnesses:
G. L. Richardson
P. Thiele
Inventor:
Chas. A. Reade
by Fred. Artos
his atty in fact.

UNITED STATES PATENT OFFICE.

CHARLES A. READE, OF CHICAGO, ILLINOIS.

VEHICLE.

SPECIFICATION forming part of Letters Patent No. 475,891, dated May 31, 1892.

Application filed May 28, 1891. Serial No. 394,353. (No model.)

*To all whom it may concern:*

Be it known that I, CHARLES A. READE, a citizen of the United States, residing at Chicago, in the county of Cook and State of Illinois, have invented certain new and useful Improvements in Wheeled Vehicles; and I do hereby declare the following to be a full, clear, and exact description of the invention, such as will enable others skilled in the art to which it appertains to make and use the same.

My invention relates to certain new and useful improvements in wheeled vehicles, such as the hansom-cab; and it consists, first, in providing such vehicles with an additional wheel located in its rear centrally of its width, whereby the horse motion to the vehicle is avoided and the vehicle allowed to run perfectly level and prevented from tilting backward in case of accident; second, of an addition of a wheel to the runner or bracket which holds the step to receive the weight of the vehicle when the horse is detached by accident or otherwise, and, finally, of extended side walls, the upper portions of which are adapted to be swung upward or downward, or when not in use to be removed altogether, if desired.

In the accompanying drawings, Figure 1 is a side elevation of the vehicle, the same partially in vertical section, showing means for ventilating the same. Fig. 2 is a rear end view of the vehicle, a portion of the back-board being broken away to show the ventilating device and also showing very clearly the mode of securing an additional wheel beneath the driver's seat and wheels on the steps. Fig. 3 is a top view of the rear portion of the vehicle, partly in elevation and partly in section. Fig. 4 is a detail sectional view of the ventilating means, and Fig. 5 is a detail view of the locking-bar for holding the ventilator at any desired position.

A represents my improved vehicle, which is preferably a hansom-cab and which is provided with the ordinary side running wheels F F and all the other ordinary appliances of a hansom, and in addition certain novel features which I will now describe.

C is an additional wheel arranged in the rear and centrally of the width of the vehicle and directly beneath the driver's seat. This wheel is secured between the forked ends of a curved shouldered turning-shaft $i$, the upper end of which is passed up between two springs $h\, h$, secured beneath the driver's seat, the upper end of the turning-shaft being held in position by being passed through brace-supports $m\, l$ and secured to the same by a nut or otherwise. The addition of this central rear wheel does not necessitate the lengthening of the vehicle, but greatly adds to the comfort and safety of the same, as by its use the vehicle will run perfectly level and the horse motion will be broken. With this construction it will be impossible for the vehicle to tilt backward in case of accident.

$k\, k'$ are hangers, the outer one of which extends laterally to form a step $n$. Between these hangers a small wheel D is journaled or otherwise suitably fastened to arrest the downward fall of the forward portion of the vehicle in case of the horse falling or becoming accidentally or otherwise detached from the vehicle. The wheel D might be placed at the bottom or side of the step or arranged in any other suitable equivalent manner.

$f$ are extended side walls, the upper portions of which are preferably glazed and so hinged as to be swung into the interior of the vehicle and secured to the upper part of the same, or by hinging the upper portion of the extended walls about midway of their height, as shown in dotted lines in Fig. 1, they may be swung downward against the sides of the vehicle, or when desired removed entirely.

From the foregoing it will be seen that a very safe, convenient, and comfortable vehicle is produced which is void of all horse motion, cannot tilt backward, is thoroughly ventilated, and is protected from injury when the horse becomes accidentally or otherwise detached from the same.

It is obvious that the driver's seat in the rear might be dispensed with and the same placed on a suitable platform on the front part of the vehicle without departing from the spirit of my invention.

What I claim as my invention is—

1. An improved hansom-cab comprising in its construction side running wheels F F, an elevated driver's seat located at a considerable distance in rear of the body of the hansom, and wheel C, located in rear of the body of the hansom and centrally of its width beneath said driver's seat, the said wheel being secured to the hansom by a forked, curved, shouldered turning-shaft $i$, the latter being held in position by supports $m\ l$, which are located between a pair of springs $h\ h$, whereby the vehicle is prevented from tilting backward and the horse motion to the same is overcome, substantially as described.

2. An improved hansom-cab comprising in its construction side running wheels F F, an elevated driver's seat located at a considerable distance in rear of the body of the hansom, wheel C, located in rear of the body of the hansom and centrally of its width beneath said driver's seat, and extended side wall portions $f\ f$, the upper portions of which are adapted to be swung laterally, substantially as and for the purpose described.

3. In a hansom-cab having two side running wheels, the combination of a rear wheel C, located centrally of the width of the hansom, and small wheels D D, secured between hangers $k\ k'$, one of which hangers extends outwardly laterally to form a step, substantially as described.

In testimony whereof I affix my signature in presence of two witnesses.

CHARLES A. READE.

Witnesses:
FRED. ARTOS,
M. A. READE.